United States Patent
Munier et al.

(10) Patent No.: US 11,012,216 B2
(45) Date of Patent: *May 18, 2021

(54) ONE-SEGMENT PUCCH FORMATS

(71) Applicant: Telefonaktiebolaget LM Ericsson (publ), Stockholm (SE)

(72) Inventors: Florent Munier, Västra Frölunda (SE); Robert Mark Harrison, Grapevine, TX (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/563,182

(22) Filed: Sep. 6, 2019

(65) Prior Publication Data
US 2019/0394006 A1 Dec. 26, 2019

Related U.S. Application Data

(63) Continuation of application No. 15/766,851, filed as application No. PCT/SE2017/050818 on Aug. 14, 2017, now Pat. No. 10,454,647.
(Continued)

(51) Int. Cl.
*H04L 12/28* (2006.01)
*H04L 5/00* (2006.01)
(Continued)

(52) U.S. Cl.
CPC .......... *H04L 5/0051* (2013.01); *H04L 1/1812* (2013.01); *H04L 5/0012* (2013.01);
(Continued)

(58) Field of Classification Search
CPC ............ H04L 5/0094; H04W 72/0413; H04W 72/00; H04W 72/1284
(Continued)

(56) References Cited

U.S. PATENT DOCUMENTS

| 9,515,773 B2 | 12/2016 | Barbieri et al. |
| 2010/0303013 A1 | 12/2010 | Khandekar et al. |

(Continued)

FOREIGN PATENT DOCUMENTS

| CN | 101594683 A | 12/2009 |
| CN | 104303573 A | 1/2015 |

(Continued)

OTHER PUBLICATIONS

Qualcomm Incorporated, "Collision handling", 3GPP TSG RAN WG1 Meeting #85, Nanjing, China, May 23, 2016, pp. 1-4, R1-164446, 3GPP.
(Continued)

*Primary Examiner* — John Pezzlo
(74) *Attorney, Agent, or Firm* — Coats & Bennett, PLLC

(57) ABSTRACT

A user equipment (UE) that performs control signal transmission according to a single-segment subframe format is described. In an aspect, the UE selects a single-segment subframe format as an uplink transmission format for a subframe instead of a multi-segment subframe format. This selection may be based on an indication received by a network node that the single-segment subframe format is to be used for transmission of the one or more control signals. In addition, the UE transmits the one or more control signals on an uplink control channel using the single-segment subframe format.

22 Claims, 5 Drawing Sheets

Related U.S. Application Data

(60) Provisional application No. 62/401,490, filed on Sep. 29, 2016, provisional application No. 62/374,495, filed on Aug. 12, 2016.

(51) Int. Cl.
*H04L 1/18* (2006.01)
*H04W 72/04* (2009.01)
*H04J 1/16* (2006.01)

(52) U.S. Cl.
CPC .......... *H04L 5/0053* (2013.01); *H04L 5/0073* (2013.01); *H04W 72/0413* (2013.01); *H04L 5/001* (2013.01); *H04L 5/0098* (2013.01)

(58) Field of Classification Search
USPC ........................................ 370/252, 329, 442
See application file for complete search history.

(56) References Cited

U.S. PATENT DOCUMENTS

| | | |
|---|---|---|
| 2012/0046032 A1 | 2/2012 | Baldemair et al. |
| 2013/0301564 A1 | 11/2013 | Chen et al. |
| 2014/0078942 A1 | 3/2014 | Noh et al. |
| 2016/0192388 A1* | 6/2016 | Ekpenyong .......... H04L 1/1829 370/329 |
| 2017/0041923 A1 | 2/2017 | Park |
| 2017/0055232 A1* | 2/2017 | Kim ..................... H04W 76/27 |
| 2017/0373794 A1* | 12/2017 | Yi ......................... H04L 1/0061 |
| 2019/0098622 A1 | 3/2019 | Lee et al. |
| 2019/0158334 A1 | 5/2019 | Kim et al. |
| 2019/0174440 A1 | 6/2019 | Kwak et al. |

FOREIGN PATENT DOCUMENTS

| | | |
|---|---|---|
| CN | 105846963 A | 8/2016 |
| RU | 2011153796 A | 7/2013 |
| RU | 2012148136 A | 5/2014 |
| WO | 2013067430 A1 | 5/2013 |
| WO | 2016123045 A1 | 8/2016 |

OTHER PUBLICATIONS

Ericsson, "PUCCH transmission for MTC," 3GPP TSG RAN WG1 Meeting #81, Fukuoka, Japan, May 25, 2015, pp. 1-6, R1-152505, 3GPP.

Catt, System Analysis of UL TTI Shortening, 3GPP TSG RAN WG1 #84, Malta Feb. 15-19, 2016, R1-160739.

* cited by examiner

ONE-SEGMENT PUCCH FORMATS

RELATED APPLICATIONS

This application is a continuation of prior U.S. application Ser. No. 15/766,851, filed 9 Apr. 2018, which was the National Stage of International Application PCT/SE2017/050818 filed 14 Aug. 2017, which claims benefit of U.S. Provisional Application 62/374,495, filed 12 Aug. 2016, and U.S. Provisional Application 62/401,490, filed 29 Sep. 2016, the entire disclosure of each being hereby incorporated by reference herein.

TECHNICAL FIELD

The present disclosure generally relates to a wireless communication system, and specifically relates to uplink control channel transmissions within the wireless communication system.

BACKGROUND

In current wireless communication systems, a user equipment (UE) communicates with a network node (such as a base station, eNB, or other network device) to receive data over one or more downlink channels in a cell associated with the network node. To maintain channel and data transfer integrity, the UE may likewise transmit control signaling to the network node on one or more uplink channels. For instance, uplink control signaling from the UE to the network node can include hybrid automatic repeat request (HARQ or H-ARQ) acknowledgements for received downlink data, UE reports related to the downlink channel conditions that are used as assistance for the downlink scheduling, and/or scheduling requests indicating that the UE requires uplink resources for uplink data transmissions.

This uplink control signaling can be transmitted, for example, on a Physical Uplink Control Channel (PUCCH), which presently adheres to a multi-segment subframe structure according to which uplink control signal transmissions are scheduled by a network node in the time and frequency domains. Specifically, a typical Long-Term Evolution (LTE) subframe is 1 ms in length and contains two 0.5 ms slots each having a number (e.g., six or seven) of symbols. A number of resource elements corresponding to the available system bandwidth are allocated by a network-side scheduler to one or more UEs in a cell for uplink control transmission during the subframe.

In some subframes, one or more resource elements in a final symbol of the subframe (in the second slot) is reserved for UE transmission of a sounding reference signal (SRS), which is received by the network node and processed to determine characteristics (e.g., channel quality, interference, etc.) of the uplink control channel. In some instances, the UEs may be configured to perform frequency hopping for Sounding Reference Signal (SRS) transmissions. When such switching occurs, a delay in SRS transmission may occur as a result of a signal amplifier adjusting a power level from a first power level associated with PUCCH transmissions to a second power level associated with SRS transmission. In some cases, this delay does not affect control signal transmission or overall performance in the cell. Where, however, the delay reaches a threshold duration (e.g., ~symbol duration), the SRS may be delayed enough so as to overlap in time and frequency with scheduled PUCCH transmissions in the cell, causing signal "collision." To avoid this scenario, which introduces interference that can render one or both of the SRS and PUCCH undiscernible by the receiver, one or more subsequent slots may be cancelled, or "dropped," resulting in wasted system resources and decreased system throughput.

Thus, improved uplink control frame structures and related techniques for uplink signal scheduling are needed to improve system performance in situations where signal collision occurs or may occur.

SUMMARY

One or more embodiments herein can employ multiple different potential single-segment subframes that define different possible techniques for transmitting uplink control data on an uplink control channel in a wireless environment. Some embodiments may therefore dynamically select a format for one or more uplink subframes from one of the multiple different potential single-segment subframe formats and multi-segment subframe formats. In some examples, a network node or the UE operating in a cell may select a single-segment subframe format for the subframe where it is determined that SRS hopping is implemented by the UE and/or an actual or potential collision event is detected between the SRS and other uplink data in the cell. Allowing a single-segment subframe to be dynamically selected in this way may, for example, advantageously avoid collision between uplink transmission in the cell and the potential dropping of one or more uplink transmission slots that can result from collision.

More particularly, embodiments herein include a method performed by a UE for control signal transmission, which may include selecting a single-segment subframe format as an uplink transmission format for a subframe instead of a multi-segment subframe format. In addition, such a method may include the UE transmitting one or more control signals on an uplink control channel using the single-segment subframe format. The selection may be temporary, wherein the UE applies the single-segment subframe format for a specific amount of time and then reverts to the multi-segment subframe format; alternatively, the single-segment subframe format may be applied in an open-ended fashion, e.g., until the multi-segment subframe format is selected, until control transmissions are interrupted, or the like. Further alternatively, the UE may decide to switch between transmitting the single-segment subframe format (e.g., a short PUCCH format) and the multi-segment subframe format (e.g., a long PUCCH format), depending on the size and/or the content of Uplink Control Information to be transmitted; this may be practiced regardless of whether a component carrier switch is to be performed for a sounding reference signal.

Embodiments herein also include corresponding apparatus, computer programs, and carriers (e.g., computer program products), as well as network-side aspects performed by a network node.

DETAILED DESCRIPTION

Figure 1:
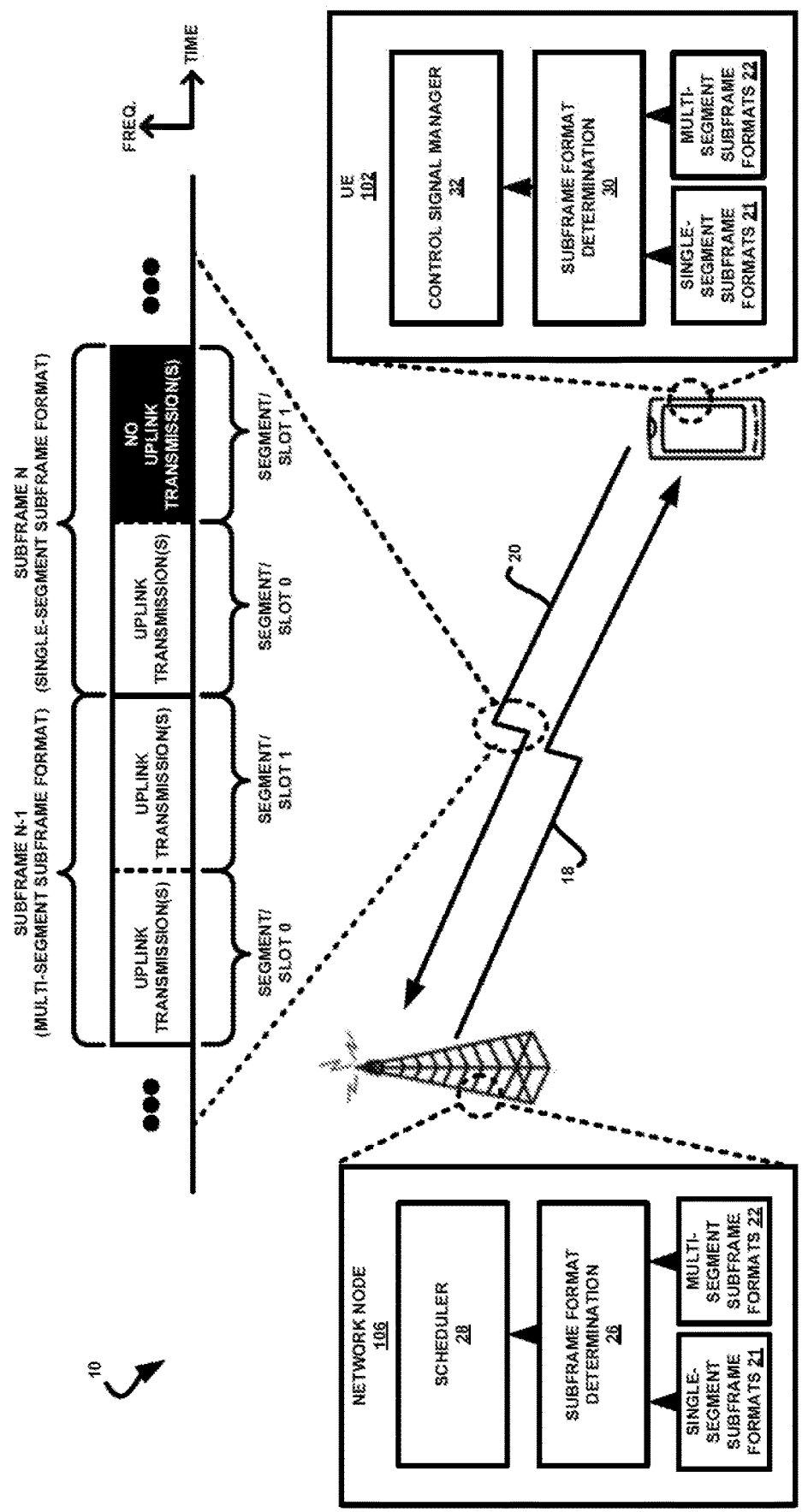
FIG. 1 is a block diagram of a wireless communication system according to one or more embodiments.

FIG. 1 illustrates a wireless communication system 10 according to one or more embodiments. The system 10 includes a network node 106 (such as, but not limited to, a base station, eNB, gNB, etc). The system 10 also includes a UE 102 (also referred to herein as a "terminal, "user terminal," or the like) in communication with the network node 106. This communication, in addition to uplink and downlink transmission of user/application data, may include uplink control signaling 20 and downlink control signaling 18. In some examples, the uplink control signaling 20 may be performed over a PUCCH or Physical Uplink Shared Channel (PUSCH). In some examples, if the UE 102 has been assigned resources for data transmission in the current subframe, uplink control information (including HARQ acknowledgements) is transmitted together with data on the PUSCH. On the PUCCH, if the terminal has not been assigned resources for data transmission in the current subframe, uplink control information is transmitted separately from user data, using resource blocks specifically assigned for the purpose. The uplink control signaling 20 may include HARQ acknowledgements for received downlink data, terminal reports related to the downlink channel conditions, uplink scheduling requests, and/or SRS transmissions. The downlink control signaling 18 may include uplink control channel scheduling data, one or more indications related to a subframe format to be utilized by the UE 102 in uplink transmissions during particular subframes, or any other control signaling related to the UE 102 or any other UEs in a cell in which the communication is taking place.

The present disclosure relates at least to uplink control signaling transmitted by a UE 102 on a PUCCH. In some examples, PUCCH time-frequency resources are located at the edges of the total available cell bandwidth, where each such resource consists of twelve subcarriers (e.g., one resource block) within each of the two segments (e.g. two slots) of an uplink subframe. In order to provide frequency diversity, these frequency resources undergo frequency hopping on the slot boundary, i.e. one "resource" consists of 12 subcarriers at the upper part of the spectrum within the first slot of a subframe and an equally sized resource at the lower part of the spectrum during the second slot of the subframe (or vice versa). If more resources are needed for the uplink Layer1/Layer2 (L1/L2) control signaling, e.g. in case of very large overall transmission bandwidth supporting a large number of users, additional resources blocks can be assigned next to the previously assigned resource blocks.

As mentioned above, uplink L1/L2 control signaling includes hybrid-ARQ acknowledgements, channel-status reports, and scheduling requests. Different combinations of these types of messages are possible by using one of available multi-segment subframe formats 22, which are capable of carrying different numbers of bits.

The bandwidth of one resource block during one subframe is too large for the control signaling needs of a single terminal. Therefore, to efficiently exploit the resources set aside for control signaling, multiple terminals can share the same resource block. This is done by assigning the different terminals different orthogonal phase rotations of a cell-specific length-12 frequency-domain sequence. The resource used by a PUCCH is therefore not only specified in the time-frequency domain by the resource-block pair, but also by the phase rotation applied. Similarly to the case of reference signals, there are up to twelve different phase rotations specified, providing up to twelve different orthogonal sequences from each cell-specific sequence. However, in the case of frequency-selective channels, not all the twelve phase rotations can be used if orthogonality is to be retained. Typically, up to six rotations are considered usable in a cell.

Layer 1/Layer 2 is used for hybrid-ARQ acknowledgements and scheduling requests on the PUCCH. It is capable of carrying up to two information bits in addition to Discontinuous Transmission (DTX), whereby if no information transmission was detected in the downlink, no acknowledgement is generated in the uplink. Hence, there are three or five different combinations, depending on whether MIMO was used on the downlink or not:

| Combination | No MIMO | MIMO | |
| --- | --- | --- | --- |
| | | $1^{st}$ transport block | $2^{nd}$ transport block |
| 1 | ACK | ACK | ACK |
| 2 | NAK | ACK | NAK |
| 3 | DTX | NAK | ACK |
| 4 | | NAK | NAK |
| 5 | | DTX | |

Currently, several PUCCH "formats" are utilized for PUCCH communication in a particular LTE Release 13 subframe. For purposes of the present disclosure, these presently-utilized PUCCH formats are referred to herein as "legacy" PUCCH formats, Release 13 PUCCH formats, multi-segment (or multi-slot) subframe formats 22, or simply PUCCH formats. These legacy formats will be described below, along with the presently proposed single-segment (e.g., single-slot) subframe formats 21.

For instance, legacy PUCCH format 1 (three formats, 1, 1a, and 1b, exist in the current specifications, although herein they are all referred to as format 1 for simplicity) uses the same structure in the two segments (e.g., slots, symbols, etc.) of a subframe. For transmission of a hybrid-ARQ acknowledgement, the single hybrid-ARQ acknowledgement bit is used to generate a BPSK symbol (in case of downlink spatial multiplexing the two acknowledgement bits are used to generate a Quadrature Phase Shift Keying (QPSK) symbol). For a scheduling request, on the other hand, the Binary Phase Shift Keying (BPSK)/QPSK symbol is replaced by a constellation point treated as negative acknowledgement at the eNodeB. The modulation symbol is then used to generate the signal to be transmitted in each of the two PUCCH slots.

Channel-status reports are used to provide the eNodeB with an estimate of the channel properties at the terminal in order to aid channel-dependent scheduling. A channel-status report consists of multiple bits per subframe. PUCCH format 1, which is capable of at most two bits of information per subframe, can obviously not be used for this purpose. Transmission of channel-status reports on the PUCCH is instead handled by PUCCH format 2, which is capable of multiple information bits per subframe (there are actually three variants in the LTE specifications, formats 2, 2a and 2b, where the last two formats are used for simultaneous transmission of hybrid-ARQ acknowledgements as discussed below—for simplicity, they are all referred to as format 2 herein). PUCCH format 2 is based on a phase rotation of the same cell-specific sequence as format 1.

PUCCH format 3 is designed for carrier aggregation purpose. The multiple ACK/NACK bits are encoded to form 48 coded bits. The coded bits are then scrambled with cell-specific (and possibly Discrete Fourier Transform Spreading Orthogonal Frequency Division Multiplexing (DFTS-OFDM) symbol dependent) sequences. In PUCCH format 3, 24 bits are transmitted within the first slot and the other 24 bits are transmitted within the second slot. The 24 bits per slot are converted into 12 QPSK symbols, Discrete Fourier Transform (DFT) precoded, spread across five DFTS-OFDM symbols and transmitted within one resource block (bandwidth) and five DFTS-OFDM symbols (time). In addition, PUCCH format 3 UE-specific spreading sequence that enables multiplexing of up to five users within the same resource blocks.

PUCCH formats 4 and 5 are extension of format 3 that allow more HARQ data to be transmitted. This stems from the extension of carrier aggregation in Release 13, allowing up to 32 component carriers. Format 4 uses 144 blocks of QPSK symbols spread over the two slots. No cyclic shift is used so that every symbol can transmit 2 HARQ coded bits. Each block corresponds to one resource block (12 subcarriers) in the frequency domain. In the time domain, the first slot is occupied by 6 data OFDM symbols and 1 reference signal OFDM symbol, and the second slot contains 5 data symbol and 2 reference symbols.

PUCCH format 5 is similar to format 4 and uses 72 QPSK symbols spread over two slots. Size 2 code division multiplexing allows the multiplexing of users. Format 5 occupies one resource block (12 subcarrier) in the frequency domain. In the time domain, the two slots are each occupied by 6 data OFDM symbols and 1 reference signal OFDM symbol.

In addition, the use of LTE carrier aggregation (CA), introduced in Release 10 and enhanced in Release 11, offers means to increase the peak data rates, system capacity and user experience by aggregating radio resources from multiple carriers that may reside in the same band or different bands and, for the case of inter-band TDD CA, may be configured with different UL/DL configurations. In Release 12, carrier aggregation between TDD and FDD serving cells is introduced to support UE connecting to them simultaneously.

In Release 13, LAA (Licensed-Assisted Access) has attracted significant interest for its potential to extend the LTE carrier aggregation feature toward capturing the spectrum opportunities of unlicensed spectrum in the 5 GHz band. WLAN operating in the 5 GHz band already supports 80 MHz in the field and 160 MHz is to follow in Wave 2 deployment of IEEE 802.11ac. There are also other frequency bands, such as 3.5 GHz, where aggregation of more than one carrier on the same band is possible, in addition to the bands already widely in use for LTE. Enabling the utilization of at least similar bandwidths for LTE in combination with LAA as IEEE 802.11ac Wave 2 will support calls for extending the carrier aggregation framework to support more than 5 carriers. The extension of the CA framework beyond 5 carriers was approved to be one work item for LTE Release 13. The objective is to support up to 32 carriers in both UL and DL.

Compared to single-carrier operation, a UE operating with CA has to report feedback for more than one DL component carrier. Meanwhile, a UE does not need to support DL and UL CA simultaneously. For instance, the first release of CA-capable UEs in the market only supports DL CA (and not UL CA). This is also the underlying assumption in the 3GPP RAN4 standardization. Therefore, an enhanced UL control channel, i.e. PUCCH format 3 was introduced for CA during Release 10 timeframe. However, in order to support more component carriers in Release 13, the UL control channel capacity becomes a limitation;

In carrier aggregation, PUCCH transmission can be done with two different ways. The first method is based on the use of PUCCH format 3 that is based on DFTS-OFDM.

The second CA PUCCH method is called channel selection. The basic principle is that the UE is assigned a set of PUCCH format 1a/1b resources. The UE then selects one of resources according to the ACK/NACK sequence the UE should transmit. On one of the assigned resource the UE would then transmit a QPSK or BPSK. The eNB detects which resource the UE uses and which QPSK or BPSK value the UE fed back on the used resource, and combines this into a HARQ response for associated DL cells.

As discussed briefly above, delays associated with SRS transmission (e.g., in SRS frequency hopping scenarios, have been known to cause a delay that meets a certain criterion (e.g., has a duration greater than (or sometimes also equal to) a threshold duration) that if met, causes the network node 106 and/or the UE 102 to determine that one or more slots should be dropped (i.e., the uplink control data transmissions over the PUCCH for these one or more slots are canceled or delayed). Although helping to ensure that collision is avoided, these delays introduce performance losses and, potentially, the loss of data transmissions altogether (e.g., the transmissions for the dropped slots are not subsequently transmitted).

The discussion on SRS based carrier switching/hopping started in RAN1#84b [1-3]. In the present invention, the impact of handling collisions (between transmitting SRS on another CC and PUCCH or PUSCH channels in the CA CC from which the switching is done) is discussed and several novel solutions to handle the dropping of slots are proposed.

The impact of collision is highly dependent on how long interruption time is introduced by the switching of SRS. A few microseconds can be handled on the requirement level as a RAN4 issue. Requirement specifications (e.g., 3GPP 36.101) have specified transition delay tolerances to allow power amplifiers to switch between PUCCH and SRS power levels. If the switching time is within the same order of magnitude, RAN4 can adjust the requirements.

If the switching delay meets a criterion (e.g., is on the order of a SC-OFDM symbol length or more, etc.) there can be an impact in network performance and capacity at least in term of PUCCH/PUSCH throughput which in turn leads to drops in network user capacity. SRS-based carrier switching does not currently have a standardized solution to handle dropping of slots which cannot be transmitted due to the interruption time needed to switch between component carriers.

Accordingly, one non-limiting objective of the example embodiments described herein is to maintain as much of a payload of a control signal subframe when one of the two segments (e.g., slots, symbols, etc.) must be dropped (i.e., transmissions scheduled for the dropped segment/slot are not transmitted). To meet this end, the present application describes several non-limiting subframe structures that utilize one segment instead of the two segments (e.g., where the segment can be a slot of a Release 13 subframe, for instance, though this is not a limiting aspect). Such a structure is illustrated in subframe N of FIG. 1, wherein uplink control transmissions occur in one of the slots (in FIG. 1, slot 0 of subframe N, although they may occur alternatively in slot 1) and do not occur in the other slot (in FIG. 1, slot 0 of subframe N). For instance, in some embodiments herein, PUCCH formats 1, 1a, 1b, 3, 4, and 5 (described above) are compressed to one of the two slots that Release 13 PUCCH formats occupy (see, e.g., slots 0 and 1 of subframe N-1 of FIG. 1, which has a multi-segment (specifically, multi-slot) subframe format according to, for example, those utilized presently in Release 13 implementations). In some embodiments, PUCCH Channel State Information (CSI) reporting payloads are halved to compensate for the loss of half the PUCCH resource and power offsets can compensate for the loss of the second slot. Release 13 reference signal designs, channel coding, interleaving, rate matching, and slot structures can be used along with the above aspects. As such, the present embodiments allows UEs/network nodes to communicate control information during a single segment (e.g., single slot) in a subframe when the UE must drop one slot (as it is the case in SRS carrier based switching).

Accordingly, the description below describes several potential single-segment subframe formats 21, which can be selected for use in one or more subframes by network node 106 or UE 106, for instance, by processing executed in a control signal manager 32 of the UE 102 or a scheduler 28 of the network node. For purposes of the present disclosure, the term "segment" (as used in the terms single-segment, multi-segment, and the like) may refer to any time and/or frequency resource group used to model a wireless communication channel, such as, but not limited to, a slot, a symbol, or any other related entity known in the art.

In some examples described herein, the network node 106 and UE 102 may negotiate as to which of a single-segment subframe format 21 or multi-segment subframe format 22 to utilize, or one of the network node 106 or the UE 102 may be charged with making such a determination. In some examples, this determination may include determining whether an SRS is to be transmitted by the UE during a particular segment and/or subframe, whether frequency hopping between segments/subframes is utilized by the UE 102, and/or whether a delay associated with the SRS transmission or frequency hopping causes or may cause a delay that meets a particular criterion for selecting a single-segment subframe format 21 instead of a multi-segment subframe format 22.

In a further aspect, the control signal manager 32 and/or the scheduler 28 may be configured to adjust a power level associated with transmissions during a slot when a single-segment subframe format 21 is selected for a subframe. As described in further detail below, this may include increasing the power of transmissions during the single segment of the subframe by a residual amount corresponding to power that will be unused for transmissions in the other slot of the subframe.

In addition, as introduced above, when a single-segment subframe format 21 is selected instead of a multi-segment subframe format 22, the network node 106 and/or UE 102 may choose between multiple potential single-segment subframe formats 21 available to be utilized. Examples of these available single-segment subframe formats will now be described in detail, some of which are described in relation to the multi-segment subframe formats 22 described above (i.e., Release 13 two-slot subframe formats). In certain example embodiments, the number of acknowledgement/negative acknowledgement (A/N or ACK/NACK) bits carried in single-segment PUCCH formats 1, 1a, and 1b is the same as the corresponding Release 13 (i.e. "legacy") formats, as the second slot can carry the same information as slot 1. This can be true when channel selection is or is not configured for the UE. In addition, power can be adjusted to account to the available power of the dropped slot, i.e. the first slot is now scaled with additional power previously available for the second slot.

In addition, according to the present disclosure, formats 2, 2a, and 2b can carry from 20 to 22 bits of payload (20 coded bits of CSI plus up to two bits of HARQ-ACK), corresponding to 10 CSI bits and 2 bits of HARQ-ACK. In order to carry that payload over a single segment, such as a single slot, it is proposed to use the coding and slot structure from PUCCH format 3 in the slot.

The slot structure and coding of PUCCH format 3 could replace formats 2, 2a, and 2b, and therefore be labeled PUCCH format 2c'. The same 11 bit Reed-Muller code would be used for CSI, and with CSI+up to 2 bit A/N. If used for TDD, format 2c may be used in subframes where only A/N for the primary cell is needed, and when the UE is configured with HARQ-ACK bundling, HARQ-ACK multiplexing or PUCCH format 1b with channel selection, since the number of A/N bits can be 2 in such cases. Power is adjusted to account to the available power of the dropped slot i.e. the first slot is now scaled with additional power previously available for the second slot.

Single-Segment PUCCH Format 3 (New Format 3b or 2d)

In example embodiments of the present disclosure, if multiplexing more than 2 A/N bits with CSI is desired in Release 13 LTE systems, legacy PUCCH format 3 may be used. If, however, a slot must be dropped, a single-segment format 3 can be used. For this single-segment subframe format, PUCCH dropping rules for format 3 (e.g., as defined in section 7.3.2 of 3GPP 36.213) are used, except that the rules that drop PUCCH content at 22 bits now drop with 12 bits. Furthermore, instead of 20 bits HARQ-ACK with 1 bit SR as in legacy PUCCH format 3, at most 10 bits HARQ-ACK and 1 bit SR is carried on single-segment PUCCH 3 of the present disclosure. In some embodiments, the 11 bit Reed-Muller code could still be used, with corresponding new rules for coding less than 11 bits containing both A/N and CSI, since A/N is not multiplexed with CSI for less than 11 bits in Release 13. In addition, power can be adjusted to account to the available power of the dropped slot i.e. the first slot is now scaled with additional power previously available for the second slot.

In any event, the maximum of transmitted HARQ-ACK bits in the single-segment PUCCH format 3 is less than in the legacy PUCCH format 3, and so may be considered as a smaller version of PUCCH format 3, e.g. 'format 3b'. Alternatively, given that the payload size is similar to PUCCH format 2, it may be considered as a new PUCCH format 2 that allows CSI and HARQ-ACK to be multiplexed, e.g. a 'format 2d'.

Single-Segment PUCCH Formats 4 and 5

PUCCH format 5 (with normal CP) can carry 12 subcarriers/2 CDM users×6 symbols/slot×2 slots×2 bit QPSK=144 channel bits. If only one slot is used, then 72 channel bits can be carried.

So, the number of channel bits when PUCCH format 5 is shortened to one slot can somewhat exceed the 48 bits in PUCCH format 3. A simple solution (similar to 'format 2c' above) then would be to create a new PUCCH format using a single-segment of PUCCH format 5 that exactly follows the behavior of PUCCH format 3 with respect to coding and CSI dropping rules. Such a new format would carry no more than 21 bits payload. This new format could be used to construct a second version of PUCCH format 3, e.g. a PUCCH format 3a', and be used in place of PUCCH format 3 for when a UE needs to transmit PUCCH format 3 but must also transmit only in one slot in a given subframe. For example, when a UE configured for PUCCH formats 3, 4, or 5 determines that PUCCH format 3 should be used (according to Release 13), but only one slot is available to transmit PUCCH, then PUCCH format 3a would be used instead.

Similar to PUCCH format 5, format 4 allows several blocks of 144 bits (72QPSK symbols) per slots, or 288 coded bits per subframes.

Single-segment subframe formats based on PUCCH formats 4 and 5, e.g. 'format 4a', and 'format 5a' could behave similarly, transmitting in only one slot while using Release 13 dropping rules changed to compensate for half of the REs being available as payload. For example, the dropping criterion with HARQ-ACK and CSI present for PUCCH format 4 configured with two sizes, changes to:

$$(O^{ACK}+O^{SR}+O_{P\_CSI}+O_{CRC}) \leq \min(M_{RB,1}^{PUCCH4}, M_{RB,2}^{PUCCH4}) \cdot N_{sc}^{RB} \cdot N_{symb}^{PUCCH4} \cdot N_{slot}^{PUCCH,r}$$

Where a new parameter $N_{slot}^{PUCCH} \in \{1, 2\}$ is introduced.

For PUCCH format 4 or 5, this parameter is set to slot $N_{slot}^{PUCCH}=1$ in subframes where UE can only transmit in one segment (e.g., one slot) of the serving cell, and $N_{slot}^{PUCCH}=2$ otherwise. In some embodiments of the present disclosure, transmitting using legacy (i.e., Release 13) PUCCH format 4 or format 5 in only one slot is still considered PUCCH format 4 or format 5. In such cases, the UE can be configured with PUCCH format 4 or PUCCH format 5, and informed by the network that it should transmit PUCCH format 4 or format 5 using one segment in certain subframes, such as those where the UE may switch to another carrier to transmit SRS. The network may inform the UE of this by indicating to the UE that $N_{slot}^{PUCCH}=2$ should be used in certain subframes, such as the switching subframes. In addition, power can be adjusted to account to the available power of the dropped slot, for example such that the first segment is scaled with additional power previously available for the second segment in legacy subframe formats.

Furthermore, because legacy PUCCH format 5 supports a variety of code rates (from 0.08 to 0.8), single-segment PUCCH format 5 as described herein can allow from 4 to 48 bits payload (e.g., information bits). Therefore, if a UE transmits using the legacy PUCCH format 3 (20 bits HARQ plus a one-bit scheduling request) but is constrained to use only one segment, the single-segment format 5 could be utilized as a viable improvement over existing formats.

As introduced above, one or both of the network node 106 and the UE 102 may adjust the transmission power for control signal transmissions in the single utilized slot of a single-segment subframe format. Embodiments that adjust power to account for the available power of the dropped slot may use an additional factor in the UE power control calculations. One such embodiment uses a factor $\Delta_{slot}(i)$ that increases the transmitted power of PUCCH in subframes where the UE transmits a single-segment PUCCH format relative to subframes where the UE transmits a Release 13 PUCCH format. This may be expressed as $$P'_{PUCCH}(i) = \min\left\{ \begin{array}{l} P_{CMAX,c}(i), \\ P_{PUCCH}(i) + \Delta_{slot}(i) \end{array} \right\}$$

where:

min {a,b} is the minimum of a and b, where a and b are real numbers, $P'_{PUCCH}(i)$ is the power the UE should transmit in dB after being adjusted for operating with a single PUCH slot format configured, and $P_{PUCCH}(i)$ is calculated according to section 5.1.2.1 of 3GPP TS 36.213 rev. 13.2.0

Furthermore, $\Delta_{slot}(i)$ is 0 in subframes where UE transmits Release 13 PUCCH formats, and is a non-zero value in a subframe when the UE transmits a single-segment PUCCH format. The non-zero value may be 3 dB in some embodiments. In other embodiments the value of $\Delta_{slot}(i)$ in subframes where the UE transmits a single-segment PUCCH format is set by higher layers, for example using an RRC configured parameter or a value provided in a MAC control element.

In addition, the equation above for $P'_{PUCCH}(i)$ may be equivalently expressed by incorporating $\Delta_{slot}(i)$ in the Release 13 power control expressions for $P_{PUCCH}(i)$. For example, If serving cell c is the primary cell, for PUCCH format 1/1a/1b/2/2a/2b/3, the setting of the UE Transmit power $P_{PUCCH}$ for the physical uplink control channel (PUCCH) transmission in subframe i for serving cell c is defined in Release 13 as:

$$P_{PUCCH}(i) = \min\left\{ \begin{array}{l} P_{CMAX,c}(i), \\ P_{0\_PUCCH} + PL_c + h(n_{CQI}, n_{HARQ}, n_{SR}) + \Delta_{F\_PUCCH}(F) + \Delta_{TxD}(F') + g(i) \end{array} \right\}$$

This can be extended to support when single-segment PUCCH formats can be transmitted by the UE by including $\Delta_{slot}(i)$ as shown below:

$$P_{PUCCH}(i) = \min\left\{ \begin{array}{l} P_{CMAX,c}(i), \\ P_{0\_PUCCH} + PL_c + h(n_{CQI}, n_{HARQ}, n_{SR}) + \Delta_{F\_PUCCH}(F) + \Delta_{TxD}(F') + \Delta_{slot}(i) + g(i) \end{array} \right\}$$

In addition to adjusting power levels for single-segment subframe control signal transmissions, the network node 106 (or in some cases, the UE 102 based on a predetermined pattern/timing reference) can select a particular slot (e.g., slot 0 or slot 1 of the subframes of FIG. 1) during which control signal transmission occurs and, accordingly, the slot during which no such control signal transmission occurs. For example, because existing PUCCH formats (including formats 1, 1a, 1b, 2, 2a, 2b, 3, 4, and 5) frequency hop once per slot, it is not possible to support PUCCH frequency hopping in one subframe. However, the Release 13 PUCCH resource principles can be used, where a PUCCH's transmission in even slots is at the low end of the band, and at the high end of the band in odd slots, i.e. according to the following:

$$n_{PRB} = \begin{cases} \left\lfloor \frac{m}{2} \right\rfloor & \text{if } (m+n_s \text{ mod } 2)\text{mod } 2 = 0 \\ N_{RB}^{UL} - 1 - \left\lfloor \frac{m}{2} \right\rfloor & \text{if } (m+n_s \text{ mod } 2)\text{mod } 2 = 1 \end{cases}$$

In such cases, a UE transmitting single-segment PUCCH formats 1, 1a, 1b, 4 or 5, or the new formats 2c, 3a, 4a, or 5a, can be allocated either the even or odd slot to transmit PUCCH in a given subframe, and accordingly could transmit only when $n_s$ mod 2=0 or when $n_s$ mod 2=1, respectively. Single-segment PUCCH resource could therefore be defined as the Release 13 PUCCH format 1, 1a, 1b, 3, 4, or 5 resource plus whether the UE transmits a single-segment PUCCH format in a given subframe when $n_s$ mod 2=0 or when $n_s$ mod 2=1. Then existing PUCCH resource allocation mechanisms (implicit allocation, ARI, and ARO) can be used to determine the PRBs for both slots, and the RRC configured slot selects which RB(s) the UE will transmit on.

Therefore, as described above, aspects of the presently disclosed embodiments and techniques include selecting and utilizing single-segment subframe formats, each of which may constitute a shortened format relative to existing, or "legacy" formats. This allows the network node 106 and UE 102 to maximize the signaling payload that can be communicated in a given timeframe, while advantageously utilizing coding methods with which the devices are already configured to communicate. In addition, the aspects of the present disclosure introduce techniques for optimizing transmission power for transmissions during a single subframe slot and for selecting a slot so as to maximize the effective slot usage on a cell-wide basis (i.e., for multiple users in a particular cell).

Figure 2:
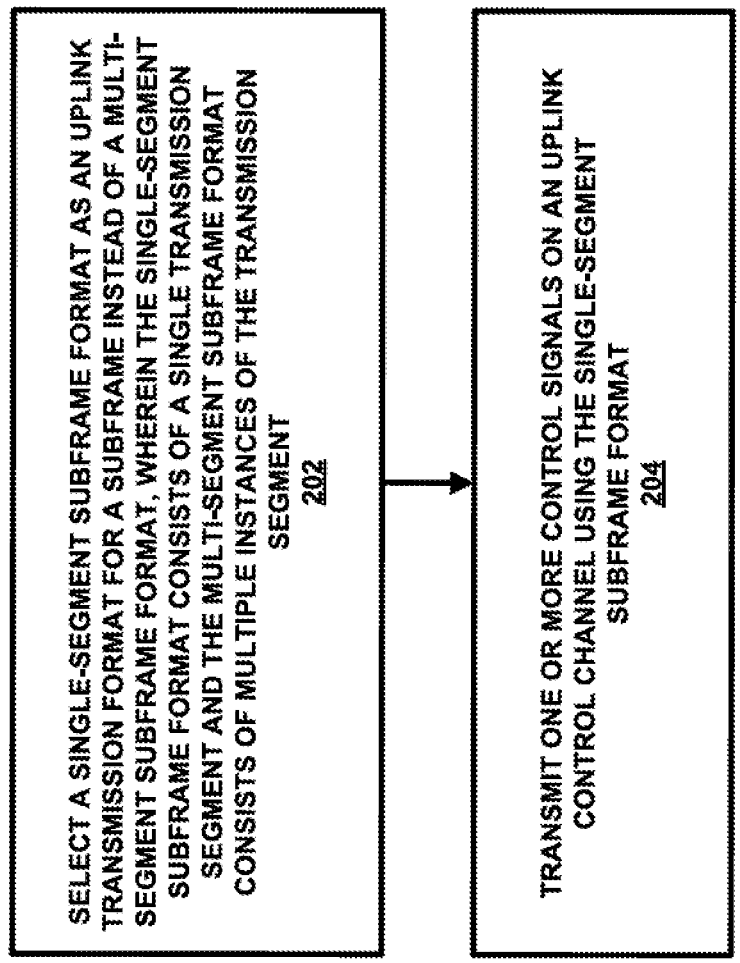
FIG. 2 is a logical flow diagram illustrating a method performed by a UE according to one or more embodiments.

FIG. 2 illustrates an example method 200 performed by one or more UEs 102 for control signal transmission. The method 200 may include, at block 202, selecting a single-segment subframe format as an uplink transmission format for a subframe instead of a multi-segment subframe format. In addition, at block 204, the UE may transmit one or more control signals on an uplink control channel using the single-segment subframe format.

In addition, although not explicitly recited in FIG. 2, method 200 may include one or more additional aspects, such as the UE selecting the subframe format by recognizing that a component carrier (CC) switch is to be performed for a sounding reference signal (SRS) in a multi-segment subframe, determining that the CC switch would introduce a transmission delay that meets a time duration criterion, and selecting the uplink transmission format in response to determining that the time duration criterion is met. In an aspect, the single-segment subframe format comprises a bit-reduced version of at least one type of multi-segment subframe format. Furthermore, the single-segment subframe format utilizes a coding method utilized by at least one type of multi-segment subframe format. The selecting may include selecting the single-segment subframe format from a set of single-segment subframe formats. The method 200 may further include setting a power level at which to transmit the one or more control signals by utilizing transmission power otherwise allocated to a slot of the subframe that is not used for transmission of the one or more control signals according to the single-segment subframe format and transmitting the one or more control signals at the power level. The power level may be a power level greater than another power level utilized for an associated transmission of the one or more control signals when the multi-segment subframe is utilized. Moreover, transmitting the one or more control signals using the single-segment subframe format may include selecting a single segment of two possible segments (e.g., slots, symbols, etc.) of the subframe during which the one or more control signals are to be transmitted. Method 200 may further include receiving, from a network node, an indication of which of a plurality of segments the uplink control channel should be transmitted using the single-segment subframe format, receiving, from the network node, an indication of a control channel frequency resource to be used to transmit the one or more control signals, the indication comprising one or more of a location of a downlink control channel received by the UE, and a resource indication carried within downlink control information on the downlink control channel. Furthermore, the method may include determining a physical resource block in which the one or more should be transmitted using the single-segment subframe format using the indication of the control channel resource and the slot in which the control channel is to be transmitted.

Figure 3:
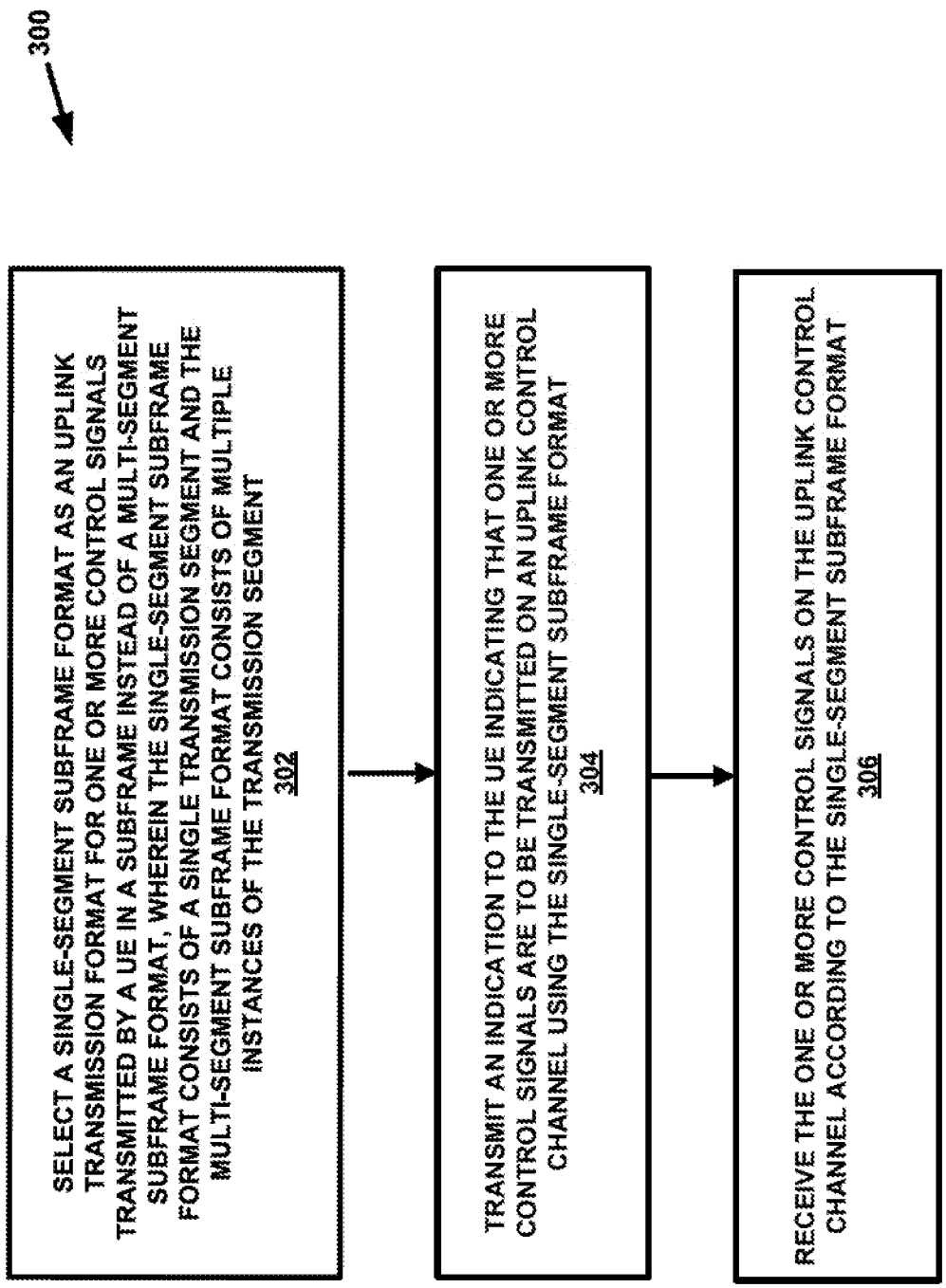
FIG. 3 is a logical flow diagram illustrating a method performed by a network node according to one or more embodiments.

FIG. 3 illustrates an example method 300 performed by one or more network nodes 106 for controlling transmission of one or more control signals by a UE 102. For example, the method 300 includes the network node 106 selecting a single-segment subframe format as an uplink transmission format for the one or more control signals transmitted by the UE in a subframe instead of a multi-segment subframe format at block 302. In addition, at block 304, the network node 106 transmits an indication to the UE indicating that the one or more control signals are to be transmitted on an uplink control channel using the single-segment subframe format. Furthermore, at block 306, the network node 106 receives the one or more control signals on the uplink control channel according to the single-segment subframe format, for example, based on the network node 106 transmitting the indication to the UE at block 304.

Figure 4A:
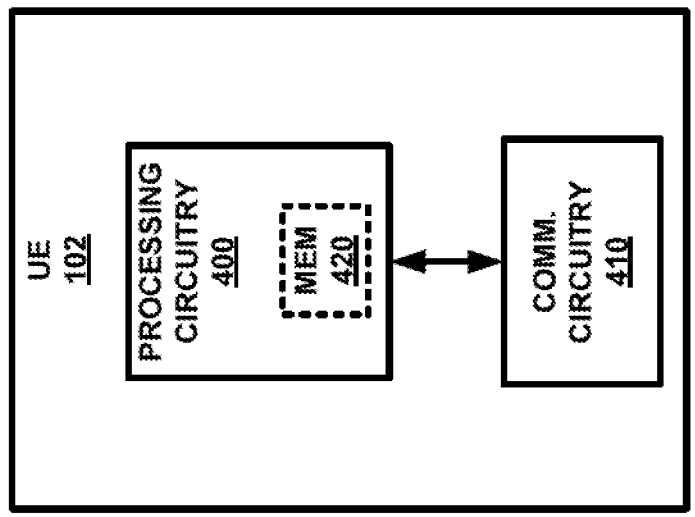
FIG. 4A is a block diagram of a UE according to one or more embodiments.

FIG. 4A illustrates a UE 102, implemented in accordance with one or more embodiments. As shown, the UE 102 includes processing circuitry 400 (which may include at least one processor) and communication circuitry 410. The communication circuitry 410 is configured to transmit and/or receive information to and/or from one or more network nodes 106 via any communication technology. Such communication may occur via one or more antennas that are either internal or external to the UE 102. The processing circuitry 400 is configured to perform processing described above, e.g., in FIG. 2, such as by executing instructions stored in memory 420. The processing circuitry 400 in this regard may implement certain functional means, units, or modules.

Figure 4B:
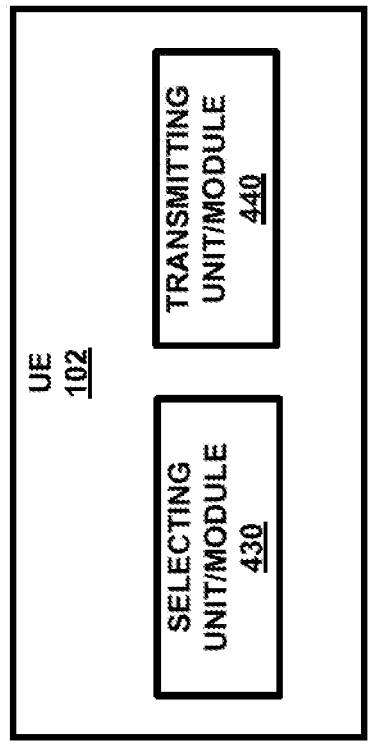
FIG. 4B is a block diagram of a UE according to one or more other embodiments.

FIG. 4B illustrates a UE 102 implemented in accordance with one or more other embodiments. As shown, the UE 102 implements various functional means, units, or modules, e.g., via the processing circuitry 400 in FIG. 4A and/or via software code. These functional means, units, or modules, e.g., for implementing the method in FIG. 2, include for instance a selecting unit or module 430 for selecting a single-segment subframe format as an uplink transmission format for a subframe. Also included is a transmitting unit or module 440 for transmitting one or more control signals on an uplink control channel using the single-segment subframe format.

Figure 5B:
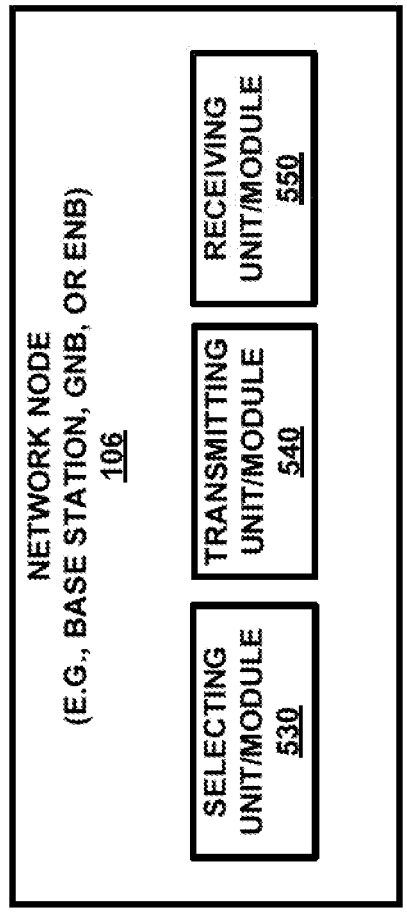
FIG. 5B is a block diagram of a radio node according to one or more other embodiments.
Figure 5A:
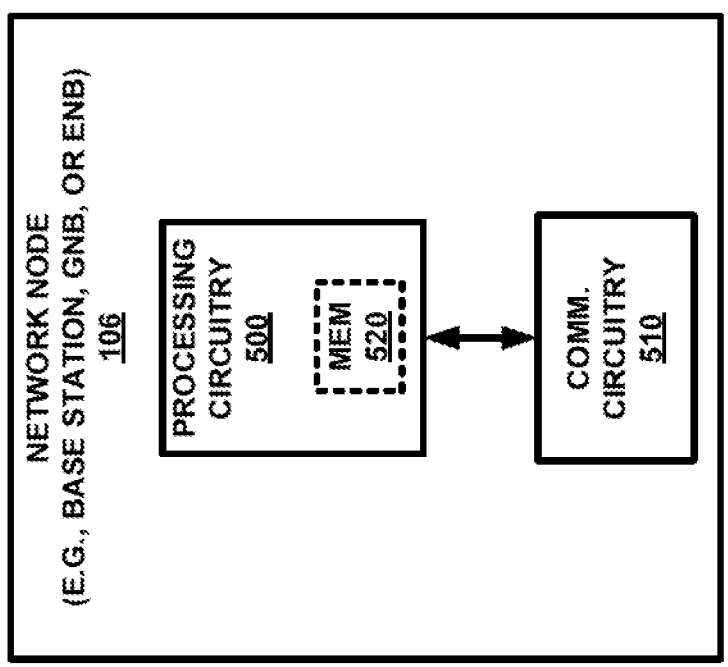
FIG. 5A is a block diagram of a radio node according to one or more embodiments.

FIG. 5A illustrates a network node 106, such as a base station, eNB, or other network-side devices, implemented in accordance with one or more embodiments. As shown, the network node 106 includes processing circuitry 500 and communication circuitry 510. The communication circuitry 510 is configured to transmit and/or receive information to and/or from one or more UEs 102 and/or one or more other nodes, e.g., via any communication technology. Such communication may occur via one or more antennas that are either internal or external to the network node 106. The processing circuitry 500 is configured to perform processing described above, e.g., in FIG. 3, such as by executing instructions stored in memory 520. The processing circuitry 500 in this regard may implement certain functional means, units, or modules.

FIG. 5B illustrates a network node 106 implemented in accordance with one or more other embodiments. As shown, the network node 106 implements various functional means, units, or modules, e.g., via the processing circuitry 500 in FIG. 5A and/or via software code. These functional means, units, or modules, e.g., for implementing the method in FIG. 3, include for instance a selecting unit or module 530 for selecting a single-segment subframe format as an uplink transmission format for a UE for a subframe. Also included is a transmitting unit or module 540 for transmitting an indication to the UE 102 indicating that one or more control signals on an uplink control channel are to be transmitted using the single-segment subframe format. In addition, a receiving unit or module 550 is included for receiving the one or more control signals on the uplink control channel.

Those skilled in the art will also appreciate that embodiments herein further include corresponding computer programs. A computer program comprises instructions which, when executed on at least one processor or processing circuitry of a node, cause the node to carry out any of the respective processing described above. A computer program in this regard may comprise one or more code modules corresponding to the means or units described above. Embodiments further include a carrier containing such a computer program. This carrier may comprise one of an electronic signal, optical signal, radio signal, or computer readable storage medium. In this regard, embodiments herein also include a computer program product stored on a non-transitory computer readable (storage or recording) medium and comprising instructions that, when executed by a processor, or processing circuitry, of a network node or UE, cause the node or UE to perform as described above. Embodiments further include a computer program product comprising program code portions for performing the steps of any of the embodiments herein when the computer program product is executed by a computing device. This computer program product may be stored on a computer readable recording medium.

Furthermore, the processing or functionality of network node 106 may be considered as being performed by a single instance or device or may be divided across a plurality of instances of network node 106 that may be present in a given network/environment such that together the device instances perform all disclosed functionality. In addition, network node 106 may be any known type of device associated with a wireless communication network, radio communication network, or content delivery network, generally, that is known to perform a given disclosed processes or functions thereof. Examples of such network nodes include eNBs, gNBs (or other types of base stations or access points), Mobility Management Entities (MMEs), gateways, servers, and the like.

In any scenario discussed above, the UE 102 herein may be, or may be comprised of any wireless communication device that is able to communicate wirelessly with a wireless communication network, and may include, in some examples, mobile devices such as mobile phones, PDAs, tablets, computers (mobile or otherwise) laptops, or the like. In addition the UE 102 may comprise an Internet-of-Things device, e.g. a device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a wireless communication device as described herein may be comprised in a vehicle and may perform monitoring and/or reporting of the vehicle's operational status or other functions associated with the vehicle.

The 3GPP has issued agreements concerning 5G New Radio (NR) terminology in the period between the earliest priority date and the filing date of the present disclosure. NR terminology and LTE terminology coincide to a considerable extent. For instance, a resource element (RE) remains 1 subcarrier×1 OFDM symbol. Yet some terms known in LTE have been given a new meaning in NR. The present disclosure, including the claims, applies prefixes "LTE" and "NR" to clarify the relevant technical context. For instance, an LTE subframe lasting 1 ms contains 14 OFDM symbols for normal CP, whereas an NR subframe has a fixed duration of 1 ms and may therefore contain a different number of OFDM symbols for different subcarrier spacings. An LTE slot corresponds to 7 OFDM symbols for normal CP, whereas an NR slot may correspond to 7 or 14 OFDM symbols; at 15 kHz subcarrier spacing, a slot with 7 OFDM symbols occupies 0.5 ms. Concerning NR terminology, reference is made to 3GPP Technical Report 38.802 v14.0.0 and to Technical Specifications to appear in the 38 series.

A non-prefixed term in this disclosure is to be understood in the LTE sense unless otherwise stated. However, any term designating an object or operation known from LTE is expected to be reinterpreted functionally in view of NR specifications. For instance, an LTE radio frame may be functionally equivalent to an NR frame, considering that both have a duration of 10 ms. An LTE subframe may be functionally equivalent to an NR slot with a corresponding number of OFDM symbols. An LTE eNB may be functionally equivalent to an NR gNB, since their functionalities as downlink transmitter are at least partially overlapping. A resource block (RB), which comprises 12 subcarriers×1 slot, is the scheduling unit in LTE, that is, the smallest assignable resource. The LTE RB is comparable to the smallest assignable resource in NR, which is the shortest mini-slot, with a single OFDM symbol. Therefore, even though some embodiments of this disclosure have been described using LTE-originated terminology, they remain fully applicable to NR technology.

The example embodiments described in the present disclosure may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A method performed by a user equipment for control signal transmission, the method comprising the user equipment:

selecting a single-slot subframe format as an uplink transmission format for a subframe with a plurality of slots instead of a multi-slot subframe format, wherein the single-slot subframe format comprises a single transmission segment for transmission in a single slot of the subframe and the multi-slot subframe format comprises multiple transmission segments for transmission in different slots of the subframe; and transmitting one or more control signals on an uplink control channel using the single-slot subframe format.

2. The method of claim 1, wherein the selecting depends on a size of Uplink Control Information to be transmitted.

3. The method of claim 1, wherein the selecting comprises:
recognizing that a component carrier (CC) switch is to be performed for a sounding reference signal (SRS) in a multi-slot subframe;
determining that the CC switch would introduce a transmission delay that meets a time duration criterion; and
selecting the uplink transmission format in response to determining that the time duration criterion is met.

4. The method of claim 1, wherein the single-slot subframe format comprises a bit-reduced version of at least one type of multi-slot subframe format.

5. The method of claim 1, wherein the single-slot subframe format utilizes a coding method utilized by at least one type of multi-slot subframe format.

6. The method of claim 1, wherein the selecting comprises selecting the single-slot subframe format from a set of single-slot subframe formats.

7. The method of claim 1, wherein the single-slot subframe format has an associated coding scheme utilized by at least one multi-slot subframe format.

8. The method of claim 1, wherein the transmitting comprises:
setting a power level at which to transmit the one or more control signals by utilizing transmission power otherwise allocated to a segment of the subframe that is not used for transmission of the one or more control signals according to the single-slot subframe format; and
transmitting the one or more control signals at the power level.

9. The method of claim 8, wherein the power level comprises a power level greater than another power level utilized for an associated transmission of the one or more control signals when the multi-slot subframe format is utilized.

10. The method of claim 1, wherein the transmitting comprises selecting a single slot of two possible slots of the subframe during which the one or more control signals are to be transmitted.

11. The method of claim 1, further comprising:
receiving, from a network node, an indication of which of a plurality of slots the uplink control channel should be transmitted using the single-slot subframe format;
receiving, from the network node, an indication of a control channel frequency resource to be used to transmit the one or more control signals, the indication comprising one or more of:
a location of a downlink control channel received by the UE; and
a resource indication carried within downlink control information on the downlink control channel; and
determining a physical resource block in which the one or more control signals should be transmitted using the single-slot subframe format using the indication of the control channel resource and the segment in which the control channel is to be transmitted.

12. The method of claim 11, wherein the multi-slot subframe format comprises an uplink pilot time slot and a downlink time slot.

13. The method of claim 1, wherein the multi-slot subframe format comprises pilot time slots.

14. The method of claim 13, wherein at least a part of a one-slot remainder of a not-selected multi-slot subframe format is used for transmitting a downlink pilot signal or uplink pilot signal.

15. The method of claim 13, wherein the one or more control signal is a Sounding Reference Signal (SRS).

16. The method of claim 15, wherein the SRS is transmitted in non-final and/or non-initial symbols of the single-slot subframe format.

17. The method of claim 13, further comprising recognizing that a component carrier (CC) switch is to be performed from a CC configured for Time Division Duplexing (TDD).

18. A user equipment (UE), comprising:
processing circuitry;
memory containing instructions executable by the processing circuitry whereby the UE is operative to:
select a single-slot subframe format as an uplink transmission format for a subframe instead of a multi-slot subframe format, wherein the single-slot subframe format comprises a single transmission segment for transmission in a single slot of the subframe and the multi-slot subframe format comprises multiple transmission segments for transmission in different slots of the subframe; and
transmit one or more control signals on an uplink control channel using the single-slot subframe format.

19. A non-transitory computer readable recording medium storing a computer program product for controlling a User Equipment (UE), the computer program product comprising software instructions which, when run on processing circuitry of the UE, causes the UE to:
select a single-slot subframe format as an uplink transmission format for a subframe instead of a multi-slot subframe format, wherein the single-slot subframe format comprises a single transmission segment for transmission in a single slot of the subframe and the multi-slot subframe format comprises multiple transmission segments for transmission in different slots of the subframe; and
transmit one or more control signals on an uplink control channel using the single-slot subframe format.

20. A method performed by a network node for controlling transmission of one or more control signals by a user equipment (UE), the method comprising the network node:
selecting a single-slot subframe format as an uplink transmission format for the one or more control signals transmitted by the UE in a subframe instead of a multi-slot subframe format, wherein the single-slot subframe format comprises a single transmission segment for transmission in a single slot of the subframe and the multi-slot subframe format comprises multiple transmission segments for transmission in different slots of the subframe;
transmitting an indication to the UE indicating that the one or more control signals are to be transmitted on an uplink control channel using the single-slot subframe format; and receiving the one or more control signals on the uplink control channel according to the single-slot subframe format.

21. A network node, comprising:
processing circuitry
memory containing instructions executable by the processing circuitry whereby the network node is operative to:
- select a single-slot subframe format as an uplink transmission format for the one or more control signals transmitted by the UE in a subframe instead of a multi-slot subframe format, wherein the single-slot subframe format comprises a single transmission segment for transmission in a single slot of the subframe and the multi-slot subframe format comprises multiple transmission segments for transmission in different slots of the subframe;
- transmit an indication to the UE indicating that the one or more control signals are to be transmitted on an uplink control channel using the single-slot subframe format; and
- receive the one or more control signals on the uplink control channel according to the single-slot subframe format.

22. A non-transitory computer readable recording medium storing a computer program product for controlling a network node, the computer program product comprising software instructions which, when run on processing circuitry of the network node, causes the network node to:
- select a single-slot subframe format as an uplink transmission format for the one or more control signals transmitted by the UE in a subframe instead of a multi-slot subframe format, wherein the single-slot subframe format comprises a single transmission segment for transmission in a single slot of the subframe and the multi-slot subframe format comprises multiple transmission segments for transmission in different slots of the subframe;
- transmit an indication to the UE indicating that the one or more control signals are to be transmitted on an uplink control channel using the single-slot subframe format; and
- receive the one or more control signals on the uplink control channel according to the single-slot subframe format.

* * * * *